Figure 1:
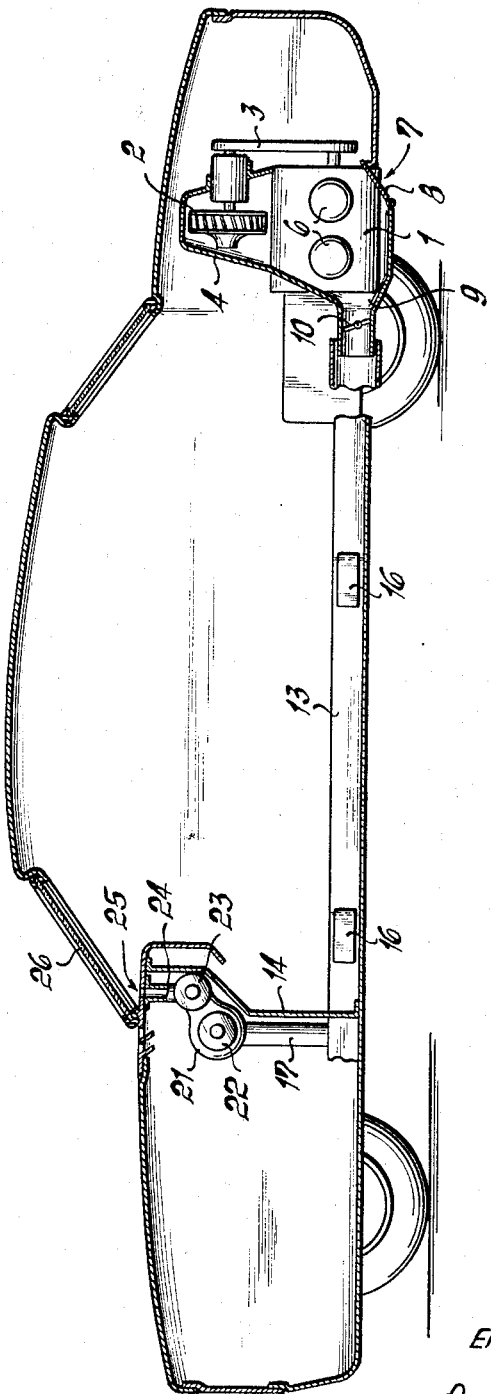

Oct. 11, 1966 E. KOMENDA 3,278,121
VEHICLE HEATING SYSTEM
Filed Sept. 17, 1964 3 Sheets-Sheet 2

INVENTOR
Erwin KOMENDA
BY Dicke + Craig
ATTORNEYS

Oct. 11, 1966  E. KOMENDA  3,278,121
VEHICLE HEATING SYSTEM
Filed Sept. 17, 1964  3 Sheets-Sheet 3

INVENTOR
Erwin KOMENDA
BY Dicke + Craig
ATTORNEYS

United States Patent Office 3,278,121
Patented Oct. 11, 1966

3,278,121
VEHICLE HEATING SYSTEM
Erwin Komenda, Stuttgart, Germany, assignor to Firma Dr. Ing. h.c. F. Porsche KG, Stuttgart-Zuffenhausen, Germany
Filed Sept. 17, 1964, Ser. No. 397,242
Claims priority, application Germany, Sept. 26, 1963, P 32,665
6 Claims. (Cl. 237—12.3)

The present invention relates to a heating and ventilating system for the passenger space of vehicles, especially of motor vehicles with an air-cooled internal combustion engine accommodated in the rear part of the vehicle whose cooling air blower supplies fresh air by way of heat exchange surfaces into lines that terminate in discharge apertures arranged within the area of the front end wall of the passenger space of the vehicle.

Numerous types of heating and ventilating installations are known already in the prior art for the passenger spaces of motor vehicles which are driven by an air cooled rear engine. These prior art installations are all characterized by a blower arranged within the area of the rear engine which supplies the warm air through air ducts from the vehicle rear part to the front part within the area of the front wall. In these prior art installations the cooling air blower of the air-cooled internal combustion engine is used principally as supply blower for the heating air. The rate of air flow in the warm air line is correspondingly relatively slight at the ends of the line within the area of the front end wall.

It has also been proposed already to assist the cooling blower of the internal combustion engine by an additional blower which is also arranged within the engine space. The pressure in the warm air line is thereby increased, however, the effect of the blower as regards a rapid air circulation in the passenger space is slight.

In contradistinction thereto, it is proposed in accordance with the present invention that a blower is interconnected or interposed into the line in proximity to the discharge apertures in the front end wall. A passenger space heating system which is more effective compared to the known prior art systems is achieved by this arrangement of the second blower within the area of the discharge apertures for the warm air located remote from the rear engine. The pressure of the blower of the internal combustion engine suffices for a slight heating of the passenger space so that any assist of the air guidance by an additional blower is obviated. However, for an intense heating of the passenger space the additional blower effects a rapid rate of air flow through the warm air line as well as also by the relatively high discharge velocity of the warm air out of the heating nozzles at the front end wall. A mixing box or mixing chamber is connected ahead, i.e., upstream of the blower which is provided with controllable apertures for the supply to the blower of warm air out of the lines or ducts and of fresh air. It is thereby possible, for example, to supply into the passenger space from the heater nozzles within the area of the warm air lines between engine space and the front end wall of the passenger space exclusively warm air and through the nozzles at the front end wall, cold, warm, or mixed fresh and heated air. The warm air is guided in an advantageous manner in two lines constituted preferably by the longitudinal lateral bearers of the body of the vehicle from the rear engine to the front end wall and a mixing box or mixing chamber with after-connected blower is operatively associated or coordinated to each line. The two blowers are driven by a single electric motor whereby the blowers are arranged on both sides of the drive motor. A handy, compact blower aggregate or unit results therefrom whose installation into the vehicle is facilitated by the fact that the support of the blower is realized by the drive motor itself.

Accordingly, it is an object of the present invention to provide a heating and ventilating system for motor vehicles, especially rear engine motor vehicles which obviates by simple means the shortcomings and drawbacks encountered with the prior art constructions.

It is another object of the present invention to provide a heating and ventilating system for the passenger space of a rear engine passenger motor vehicle which assures selective intensive heating and ventilating at the control of the driver together with sufficient rate of air flow through the warm air lines under all operating conditions.

A further object of the present invention resides in the provision of a heating and ventilating system for passenger motor vehicles which provides a fast air circulation in the passenger space together with a more effective heating thereof.

Still another object of the present invention resides in the provision of a heating and ventilating system for rear engine motor vehicles which permits an extraordinary versatile selective control to adapt the heating and/or ventilating to the need of a particular local area within the passenger space.

Another object of the present invention resides in the provision of a heating and ventilating system of the type described above which achieves all of the aforementioned aims and objects by a structurally compact and handy blower unit adapted to be easily installed and mounted within the vehicles.

Figure 2:
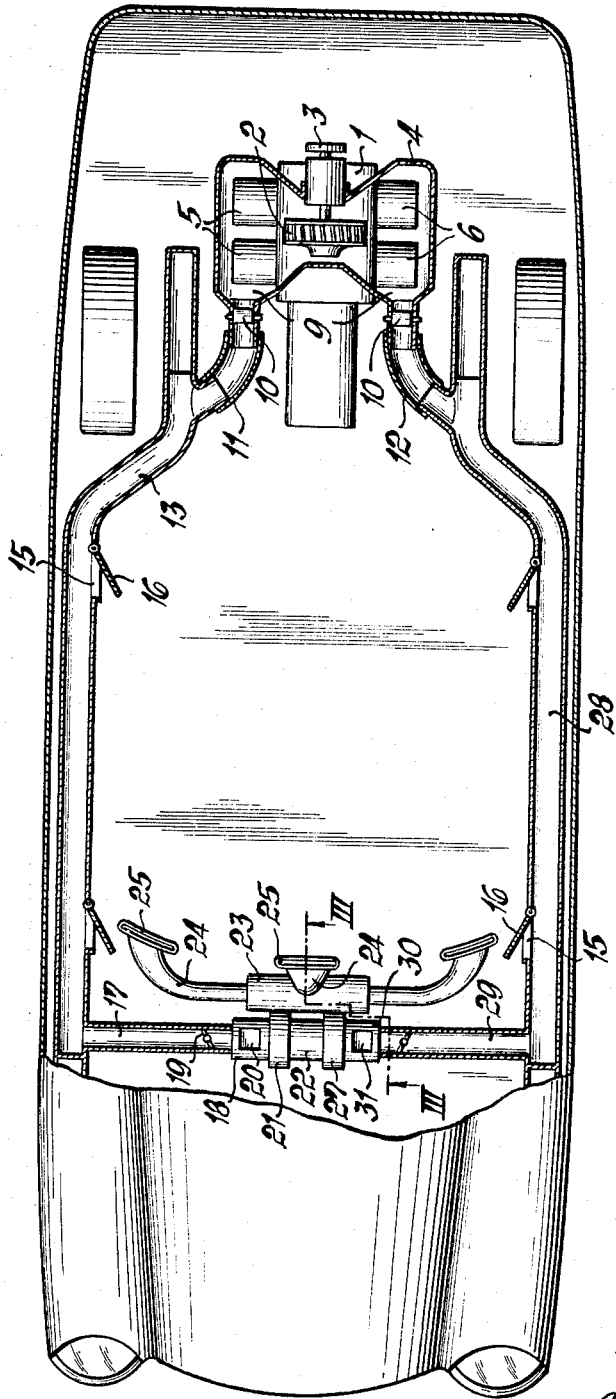
Figure 3:
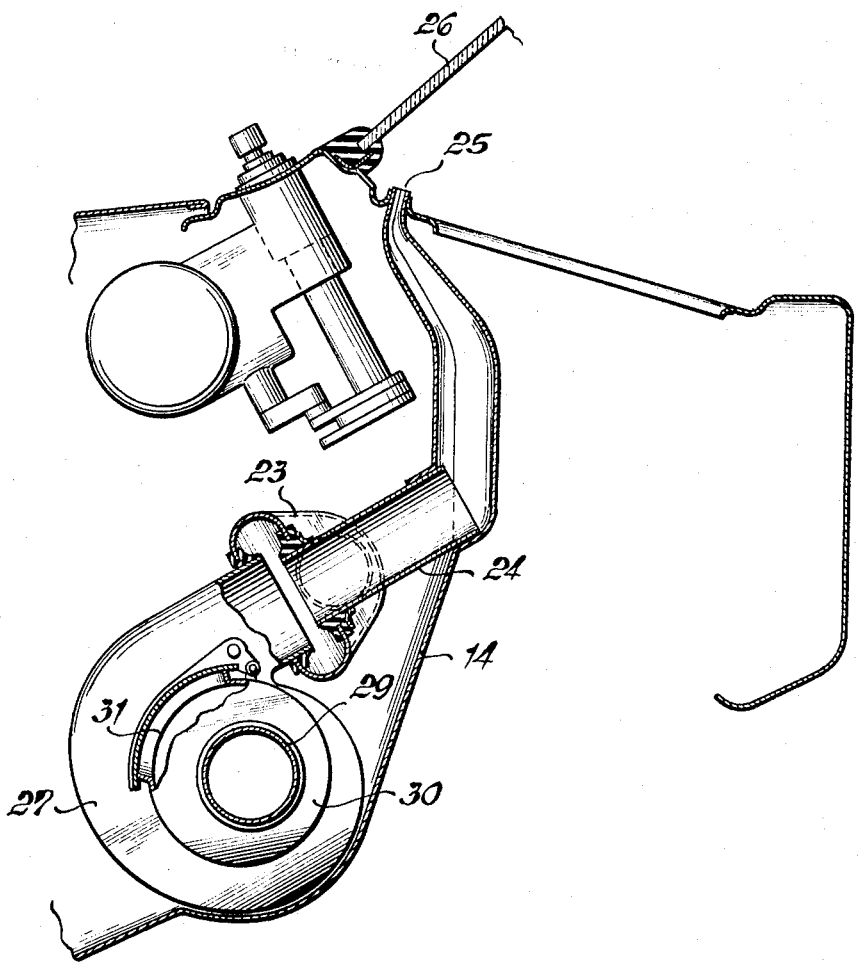

These and other objects, features and advantages of the present invention will become more obvious from the following description when taken in connection with the accompanying drawing which shows, for purposes of illustration only, one embodiment in accordance with the present invention, and wherein FIGURE 1 is a schematic longitudinal cross sectional view through a motor vehicle provided with a heating and ventilating installation according to the present invention, FIGURE 2 is a top plan view on the motor vehicle of FIGURE 1 provided with a heating and ventilating installation in accordance with the present invention, with parts broken away for sake of clarity, and FIGURE 3 is a partial cross sectional view, on an enlarged scale, taken along line III—III of FIGURE 2.

Referring now to the drawing wherein like reference numerals are used throughout the various views to designate like parts, the motor vehicle illustrated therein possesses an air-cooled internal combustion engine 1 accommodated in the rear part of the vehicle. The cooling air for the internal combustion engine is supplied by a blower 2 of conventional construction which is arranged above the engine 1 and is driven from the engine 1 by means of any suitable drive connection 3. The cooling air supplied by the blower 2 flows, guided by a sheet metal guide element 4, from the blower 2 to the cylinder rows 5 and 6 of the internal combustion engine 1 constructed as opposite piston engine, and is thereupon guided selectively either through one or more apertures 7 into the atmosphere or is utilized for the purpose of heating the passenger space of the motor vehicle. For that purpose each aperture 7 is provided with a flap or valve 8 by means of which is controlled the discharge of the heated cooling air into the atmosphere. One or several apertures 9 are provided within the sheet metal guide element 4 which are also provided with flaps or valves 10 by means of which is controlled the flow of the warm air through the apertures 9.

Lines 11 and 12 are connected to the apertures 9. Each of the lines 11 and 12, for example, the line 11 is combined with a respective lateral longitudinal bearer 13 of the body of the motor vehicle which is constructed directly as heating air line or is provided with a pipe-like additional guide means for the heating air. The warm air is guided through the longitudinal bearer 13 from the rear part of the motor vehicle up to within the area of the front end wall 14 (FIG. 1) of the passenger space. The longitudinal bearer 13 is provided within this area with several discharge apertures 15 opening into the passenger space which are adapted to be controlled by flaps, valves, or suitable slide valves 16 of conventional construction.

A line is connected to the longitudinal bearer 13 within the area of the front end wall 14 which line 17 is possibly also formed in part by portions of the body, such as box-like columns or the like or also by an additional pipe line. The line 17 terminates in a mixing box or chamber 18. Directly in front of the discharge of the line 17 into the box 18, there is provided a control valve 19 which controls the inlet of warm air into the box 18.

The box 18 is provided with an adjustable inlet aperture 20 through which fresh air is able to flow into the box 18. A blower 21 adjoins or is connected with the mixing box 18 which is driven by an electric motor 22 and which draws-in air out of the mixing box 18 and supplies the same into a distributor housing 23. Lines 24 are connected to the distributor housing 23 which lead to nozzles 25 which in turn discharge into the passenger space, for example, within the area of the windshield pane 26 of the motor vehicle.

The warm air guidance through the line 12 along the other vehicle side is constructed correspondingly. For that purpose the electric motor 22 is provided with a further blower 27 which, in a manner like the blower 21, draws-in the warm air out of the line 12 by way of the longitudinal bearer 28, line 29 as well as mixing box 30 and supplies the same into the distributor housing 23. The mixing box is again provided with an adjustable inlet aperture 31 for drawing-in fresh air. The blowers 21 and 27 are secured at the vehicle body of the motor vehicle exclusively by means of the electric motor 22, e.g., are secured by way of motor 22 to an appropriate part of the body or frame structure.

*Operation*

The operation of the heating and ventilating installation according to the present invention is as follows:

If the passenger space of the motor vehicle is to be heated with the engine running, then the apertures 7 are to be closed by means of valves 8 and the valves 10 associated with the apertures 9 are to be opened so that the cooling air supplied by the blower 2 and heated-up while passing over the cylinder rows 5 and 6 flows into the lines 11 and 12. For example, the warm air reaches from line 11 the longitudinal bearer 13 out of which it can flow directly into the passenger space, in case of need, by opening the discharge apertures 15. The warm air flows further through the longitudinal bearer 13 into the line 17 and, if the control valve 19 is in the open position thereof, into the mixing box 18. The warm air is drawn out of the mixing box 18 by the blower 21 which is driven by the electric motor 22 and is supplied by way of the distributor housing 23 into the passenger space. By opening the inlet aperture at the mixing box 18, fresh air can reach into the mixing box 18 whereby the temperature of the air supplied into the passenger space can be adjusted.

If the control valve 19 is completely closed, then with a fully open aperture 20 exclusively fresh air is supplied by the blower 21 into the passenger space. However, at the same time, warm air can reach in controllable quantities the foot area of the passengers through the apertures 15.

While I have shown and described one embodiment of the present invention, it is understood that the same is not limited thereto but is susceptible of numerous changes and modifications as known to a person skilled in the art. For example, the construction of the internal combustion engine, of the cooling blower as well as of the drive thereof may be varied at will. Similarly the heating air may be heated by means of a separate heat exchanger through which flows the fresh air. Thus, it is obvious that the present invention is not limited to the details shown and described herein but is susceptible of numerous changes and modifications, and I therefore do not wish to be limited to the details shown and described herein but intend to cover all such changes and modifications as are encompassed by the scope of the appended claims.

I claim:

1. A heating and ventilating installation for the passenger space of motor vehicles having an internal combustion engine provided with a blower, comprising:

a front end wall for said passenger space, discharge aperture means located in said passenger space in the area of said front end wall, heat exchange surface means within the area of the engine over which air is supplied by said blower, and means for supplying heating air from said heat exchange surface means to said discharge aperture means including line means for conducting the warm air from said heat exchanger surface means to said discharge aperture means, and additional blower means in said line means located in proximity to said discharge aperture means, and additional blower means in said line means located in proximity to said discharge aperture means and to said front end wall, and mixing box means connected in said line means in front of said additional blower means, said mixing box means including adjustable aperture means for the selective supply to said blower means of fresh air, said line means being formed at least in part by two lateral longitudinal bearers of the vehicle guiding the warm air from said engine to said front end wall, one mixing box means each with an additional blower means connected downstream of a respective mixing box means being operatively associated with each line means, and control valve means in said line means for selectively controlling the supply of warm air from said engine to said mixing box means, selective adjustment of said adjustable aperture means and of said cotnrol valve means being effective supply one of said heating air, said fresh air and a mixture of said heating air and fresh air to said passenger space.

2. A heating and ventilating installation for the passenger space of motor vehicles having an internal combustion engine provided with a blower, comprising:

a front end wall for said passenger space, discharge aperture means located in the area of said front end wall, heat exchange surface means within the area of the engine over which air is supplied by said blower, and means for supplying heating air from said heat exchange surface means to said discharge aperture means including line means for each vehicle side for conducting the warm air from said heat exchange surface means to said discharge aperture means, two additional blower means, one each in a respective line means and located in proximity to said discharge aperture means and to said front end wall, and mixing box means connected in said line means upstream from respective ones of said two blower means, and a single electric motor for driving the two additional blower means, and means for supporting the two blower means at the vehicle body exclusively by the electric drive motor, and selectively adjustable aperture means in said line means and in said two mixing boxes effective to selectively supply one of said heating air, said fresh air and a mixture of said heating air and fresh air to said passenger space.

3. A heating and ventilating installation for the passenger space of motor vehicles having an internal combustion engine provided with a blower, comprising:

a front end wall for said passenger space, discharge aperture means located in the area of said front end wall, heat exchange surface means within the area of the engine over which air is supplied by said blower, and means for supplying heating air from said heat exchange surface means to said discharge aperture means including line means for conducting the warm air from said heat exchange surface means to said discharge aperture means, and two additional blower means in said line means located in proximity to said discharge aperture means, and two respective mixing box means connected in said line means in front of said two additional blower means, said mixing box means including adjustable aperture means for the selective supply to said two blower means of fresh air, said line means being formed at least in part by two lateral longitudinal bearers of the vehicles guiding the warm air from said engine to the wall means, one mixing box means, each with an additional blower means connected downstream therefrom, being operatively associated with each line means, a single electric motor for driving said two additional blower means, said two blower means being disposed on respective sides of said electric drive motor, means for supporting said two blower means at the vehicle body by said electric drive motor, selectively operable control valve means in said line means upstream from each of said mixing box means for controlling the supply of warm air from said line means to said two mixing box means, selective operation of said aperture means and said control valve means being effective to cause a desired temperature of the air supplied by said discharge aperture means.

4. A heating and ventilating installation for the passenger space of motor vehicles provided with an air-cooled internal combustion engine having a cooling air blower and accommodated within the rear part of the vehicle, comprising:

approximately transversely extending front end wall means limiting the passenger space in the forward direction, heat exchange surface means within the region of the engine, means for supplying heating air from the area of said heat exchange surface means to the area of said front end wall means including said cooling air blower supplying air in heat exchange relationship with said heat exchange surface means, two line means adjoining said heat exchange surface means and terminating in discharge aperture means within the area of said front end wall means, and additional blower means in each of said line means and located in proximity to said discharge aperture means, said line means including line portions formed by two lateral longitudinal bearer structures on opposite sides of the vehicle for guiding the heating air from the rear engine to the front end wall and selectively operable aperture means in said line portions for supplying therethrough heating air directly to said passenger space within the area between the rear engine and said front end wall means, and means for selectively controlling the temperature of air supplied to said passenger space by said discharge aperture means within the area of said front end wall means including a plurality of selectively controlled aperture means controlling the admission of air including said heating air to each of said blower means.

5. A heating and ventilating installation for the passenger space of motor vehicles provided with an air-cooled internal combustion engine having a cooling air blower and accommodated within the rear part of the vehicle, comprising:

approximately transversely extending front end wall means limiting the passenger space in the forward direction, heat exchange surface means within the region of the engine, means for supplying heating air from the area of said heat exchange surface means to the area of said front end wall means including said cooling air blower supplying air in heat exchange relationship with said heat exchange surface means, two line means adjoining said heat exchange surface means and terminating in discharge aperture means within the area of said front end wall means, and additional blower means in each of said line means and located in proximity to said discharge aperture means, and mixing box means connected in each of said line means upstream of the blower means, said mixing box means including adjustable aperture means for selectively supplying fresh air to said additional blower means, said line means including line portions formed by two lateral longitudinal bearer structures on opposite sides of the vehicle for guiding the heating air from the rear engine to the front end wall means, and selectively operable aperture means in said line portions for supplying therethrough heating air directly to said passenger space within the area between the rear engine and said front end wall means, and selectively adjustable valve means in said line means upstream from each of said mixing box means for controlling the supply of said heating air to said mixing box means, said selectively adjustable valve means and said adjustable aperture means being adjustable to supply one of the following, said heating air, said fresh air, and a mixture of said heating air and said fresh air to said passenger space through said discharge aperture means.

6. A heating and ventilating installation for the passenger space of motor vehicles according to claim 5, further comprising:

a single electric drive motor for driving said additional blower means, said additional blower means being disposed on both sides of said electric drive motor.

References Cited by the Examiner
UNITED STATES PATENTS

| | | | |
|---|---|---|---|
| 2,009,823 | 7/1935 | Van Vulpen | 237—5 |
| 2,347,141 | 4/1944 | Werdehoff | 98—2 |
| 2,620,720 | 12/1952 | Booth | 98—2 |
| 2,724,556 | 11/1955 | Brubaker | 237—12.3 |
| 3,026,042 | 3/1962 | Zoltok | 237—12.3 |
| 3,096,938 | 7/1963 | Cole et al. | 237—12.3 |
| 3,207,440 | 9/1965 | Binder | 237—12.3 |

EDWARD J. MICHAEL, *Primary Examiner.*